INVENTOR.
Walter A. Reich
BY
ATTORNEY.

United States Patent Office 2,882,551
Patented Apr. 21, 1959

2,882,551

MECHANISM FOR LOWERING MEAT-CARRYING HOOKS FROM OVERHEAD TRACKS

Walter A. Reich, Kansas City, Mo., assignor to A. Reich & Sons, Inc., Kansas City, Mo., a corporation of Missouri Application July 9, 1956, Serial No. 596,503

9 Claims. (Cl. 17—24)

This invention relates to slaughterhouse equipment and particularly to novel tackle apparatus for facilitating the handling of animal carcasses through a windlass assembly and a pair of falls coiled thereon in opposite directions for lowering the carcass with respect to an overhead track from which the same is suspended.

It is the primary object of the instant invention to provide tackle apparatus including a fall having a standing part and a running part for receiving trolleys from an overhead track, together with a carcass suspended therefrom in a manner to permit lowering of the same as the running part of the fall is paid out from windlass mechanism about which the same is coiled.

Another object of the present invention is to provide carcass-handling equipment having brake means incorporated therein for retarding the rate of rotation of the windlass so that the carcass is lowered gradually into a convenient position for further handling such as within a cart or the like used to convey the same to other parts of the plant.

A further object of the present invention is the provision, in conjunction with the aforementioned features, of means for raising the lowermost end of the carcass as the trolley from which it is suspended is lowered through use of a second fall similarly coiled about the windlass but in an opposite direction from the primary standing part.

Other objects include the way in which the two rotatable elements of the windlass are connected for rotation together whereby lowering and raising opposite ends of the carcass takes place simultaneously; the manner of providing a brake assembly common to the two rotatable elements; the way in which the entire unit is mounted on a carrier that may be moved along the overhead track to desired positions; the manner of providing a collapsible toggle link arrangement within one of the falls for increasing the effective length thereof during one stage of the operation; and the manner of deflecting the trolley wheels from the track onto the proximal fall through use of a lateral rail, together with the way in which the said rail is held off the track to facilitate movement of the carriage.

Figure 1:
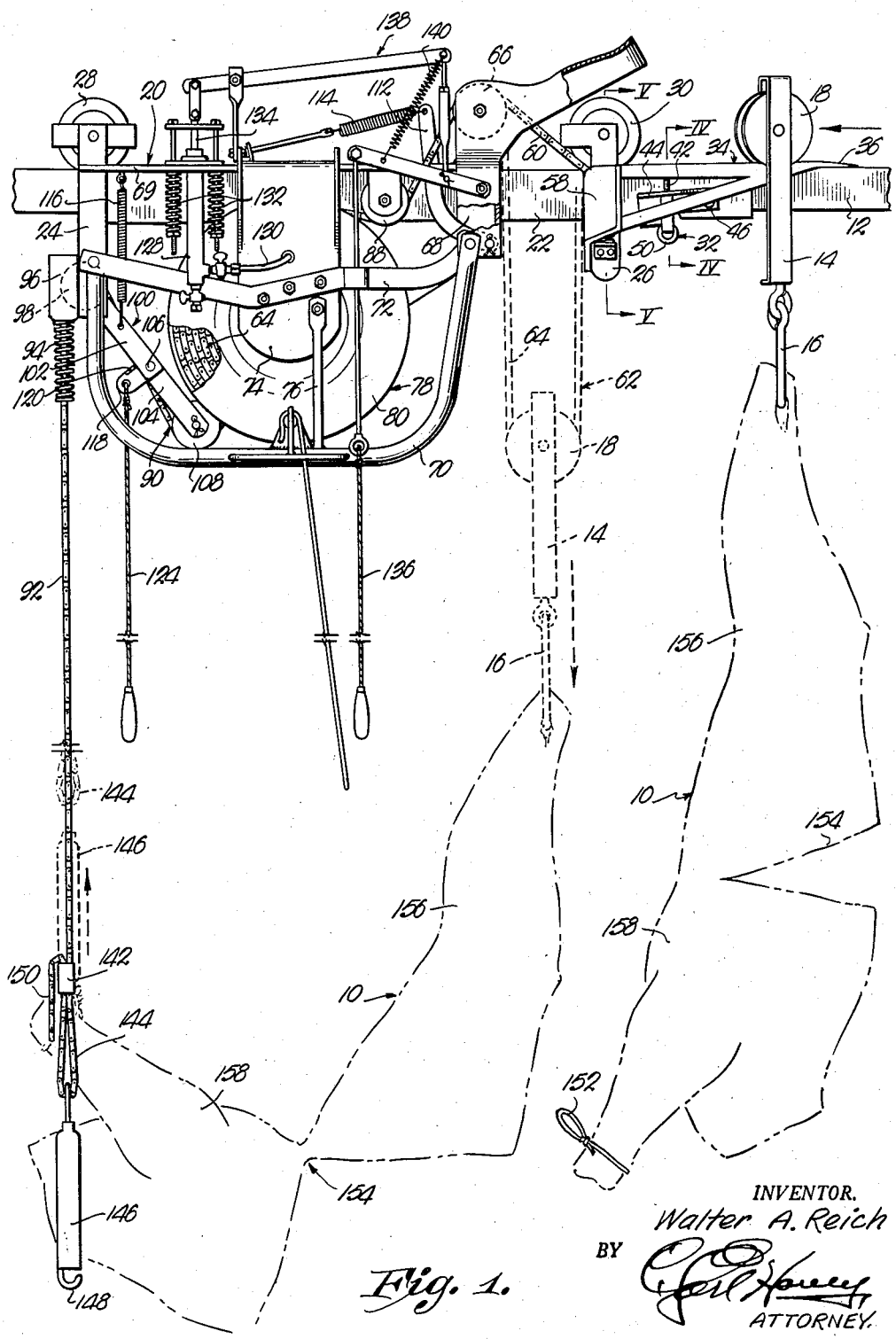
Figure 1 is a side elevational view of mechanism for lowering meat-carrying hooks from overhead tracks made pursuant to the present invention.

It is common practice in slaughterhouses to convey carcasses 10 along overhead tracks 12 through employment of a trolley 14 having a hook 16 that engages carcass 10 and a trolley wheel 18 that rides along the upper edge of the track 12.

In accordance with the principles of the instant invention, there is provided mechanism for lowering the carcass 10 from the track 12 in a manner illustrated by dotted lines in Fig. 1, such mechanism including a support in the nature of a carrier broadly designated by the numeral 20 and including an elongated bar 22 disposed along one face of the track 12.

Vertical straps 24 and 26 secured to the bar 22 are provided with track-engaging rollers 28 and 30 respectively, and a lock 32 releasably clamps the bar 22 to the track 12 to hold the carrier 20 against movement with respect thereto. A deflecting rail 34 integral with the bar 22 adjacent the uppermost edge thereof and at one end of the bar 22, extends laterally at an angle from a point overlying the track 12 to the strap 26, the outermost terminal end of the rail 34 being tapered into an inclined ramp 36. A flat, horizontal web 38 interconnects the bar 22 and the trolley-deflecting rail 34.

Figure 4:
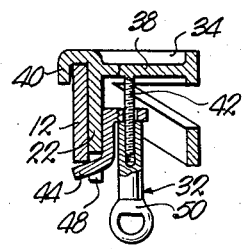
Fig. 4 is an enlarged, fragmentary, detailed cross-sectional view taken on line IV—IV of Fig. 1.
Figure 5:
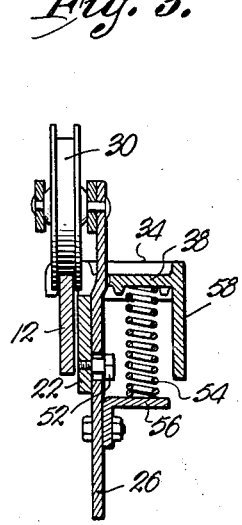
Fig. 5 is an enlarged, fragmentary, detailed cross-sectional view taken on line V—V of Fig. 1.

A portion of the bar 22 between the strap 26 and the lock 32, is formed into a hook 40 that is looped over the track 12 as seen in Figs. 4 and 5 of the drawings. The lock 32 includes a threaded bolt 42 rigid to, and depending from, the web 38 and receiving a clamp 44 that is swingable on the bar 22 by virtue of pivot 46. Bar 22 has a notch 48 in the lowermost edge thereof receiving one end of the clamp 44 and a nut 50 forming a part of the lock 32 is threaded on the bolt 42 to clamp the bar 22 tightly to the track 12 and to, therefore, clamp the rap 36 tightly against the uppermost edge of the track 12.

The strap 26 is, however, loosely attached to the bar 22 by pivot bolt 52 and, therefore, upon release of the lock 32, a spring 54 will raise the terminal end 36 of the rail 34 off the track 12 to facilitate movement of the carrier 20 along the track 12. Spring 54 is interposed between the web 38 and a shelf 56 on the strap 26 as seen in Fig. 5.

Figure 3:
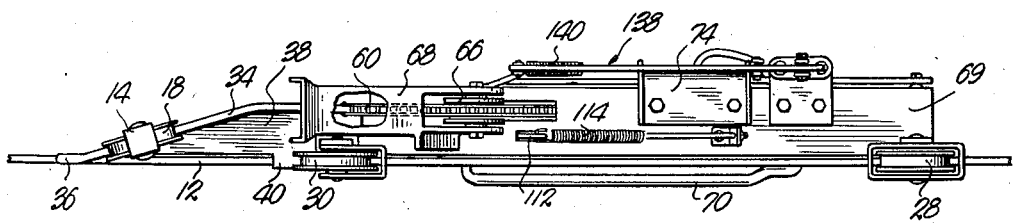
Fig. 3 is a plan view thereof.

The innermost ends of the rail 34 and web 38 terminate in a relatively short, substantially L-shaped plate 58 that is rigid to one face of the bar 22 and it is to this plate 58 that standing end 60 of a tackle fall 62 is rigidly affixed in direct alignment with the inner end of the rail 34 as best seen in Fig. 3.

Figure 2:
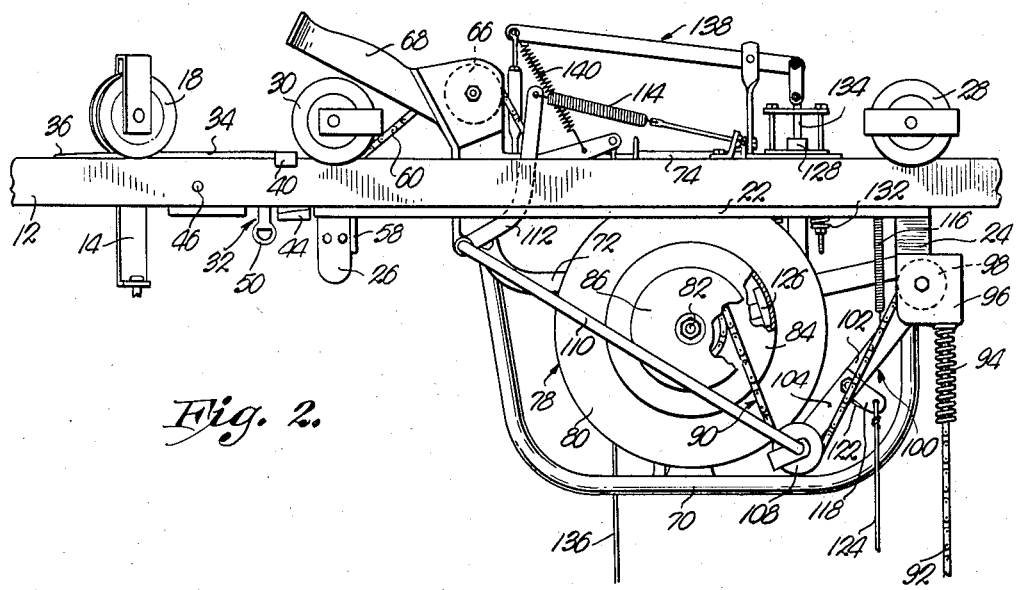
Fig. 2 is an elevational view thereof showing the opposite side of the mechanism.

The fall 62 is preferably in the nature of a flexible chain and extends into a running end 64 that passes over a pulley 66 rotatably mounted at a higher elevation than the bar 22, as seen in Figs. 1 and 2. A channel member 68 rigid to horizontal flange 69 at the upper edge of the bar 22 mounts the pulley 66 and projects rearwardly into overlying relationship with the inner end of rail 34 to guide the trolley wheel 18 onto the standing part 60 of fall 62 as will hereinafter be made clear.

The member 68 and the strap 24 are interconnected by a U-shaped framepiece 70 and by a substantially horizontal frame member 72, the latter of which in turn joins intermediate the ends thereof with a plate 74 rigid to flange 69 and depending therefrom, the plate 74 being in turn connected with the framepiece 70 by a brace bar 76.

Plate 74 supports rotatable windlass and brake structure broadly designated by the numeral 78 and including a relatively large, narrow take-up wheel 80 through the medium of axle 82, a brake drum 84 disposed between wheel 80 and a second smaller, relatively narrow take-up wheel 86, the drum 84 and the wheel 86 likewise being supported by the axle 82 and the three rotatable elements 80, 84 and 86 being joined for rotation together.

The running part 60 of the fall 62 of the tackle apparatus passes from the pulley 66 beneath an idler pulley 88 on flange 69 and thence around the wheel 80 in coiled relationship thereto in a counter-clockwise direction viewing Fig. 1. A second fall 90, also preferably in the nature of a chain, has a standing part 92 and is coiled about the smaller wheel 86 in a clockwise direction viewing Fig. 2.

A coil spring bumper 94 through which the chain 90 passes depends from a U-shaped fixture 96 secured to strap 24 at the lowermost end of the latter, and which fixture 96 also supports a pulley 98 over which chain 90 is trained.

Collapsible mechanism 100 in the nature of a pair of toggle links 102 and 104 is interposed between the fixture 96 and the take-up wheel 86. Link 102 is pivotally connected to the fixture 96 and to the link 104 by a pivot pin 106, the free end of link 104 being provided with a sheave 108 over which the chain 90 is trained. One end of a U-shaped rod 110 forms the shaft for sheave 108, rod 110 being accordingly attached to the mechanism 100. The opposite end of the rod 110 is swingably carried by the member 68 and has an arm 112 rigidly secured thereto. A spring 114 interconnects arm 112 and flange 69 and a spring 116 interconnects link 102 and bar 22.

The mechanism 100 includes additionally a short link 118 pivoted on pin 106 and having a lateral lug 120 that engages the link 102 when the mechanism 100 is in the position shown in Figs. 1 and 2. A second lug 122 on the opposite face of the link 118 is engageable with the link 104 but spaced therefrom when the mechanism 100 is extended as shown in Figs. 1 and 2.

A pull cable or the like 124 is attached to the link 118 to permit manual breaking of the toggle linkage 102—104 or collapsing of the mechanism 100 when a downward pull is exerted on the cable 124, it being understood that the links 102 and 104 are out of alignment and, therefore, slightly past center in one direction when the mechanism 100 is in the extended condition illustrated.

The brake means that includes drum 84 for normally holding the wheels 80 and 86 against rotation and retards the speed of descent of the carcass 10, may be quite conventional and has, therefore, not been illustrated other than in Fig. 2 showing a brake shoe 126 bearing against the inner cylindrical surface of the drum 84. Such shoe or shoes 128 may be actuated mechanically, hydraulically or otherwise, but in the drawings there is shown a hydraulic piston and cylinder assembly 128 having the cylinder thereof operably connected with the shoes 126 in drum 84 by fluid line 130.

The assembly 128 carried by flange 69 is provided with opposed springs 132 connected to the piston 134 thereof for normally biasing the latter downwardly and maintaining the fluid pressure on the shoes 126. Piston 134 is actuated, i.e. raised upwardly against the action of springs 132 through a manual pull cable 136 attached to suitable linkage broadly designated by the numeral 138 and pivotally connected with the piston 134, the plate 74 and the member 68, all as illustrated in Figs. 1 and 2 with a spring 140 being interposed therein to maintain the same in the normal position shown in the drawings.

Figure 6:
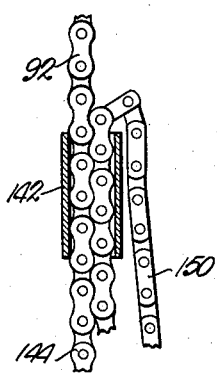
Fig. 6 is an enlarged, fragmentary, detailed view illustrating the sleeve of one of the falls for permitting adjustment of the length thereof.

The length of the standing end 92 of the chain 90 may be varied through use of a sleeve 142 shown best in Fig. 6 of the drawings. Chain 90 is rebent upon itself to form a loop 144 for receiving a weight 146 provided with a hook 148. The two lengths of the loop 144 pass through the sleeve 142 as seen in Fig. 6, and the latter holds the links of the chain 90 in interlocked relationship. The terminal end of chain 90 is provided with links 150 of a different character and capable of passing through the sleeve 142 whereby the length of the chain 90 may be varied upon slipping of the sleeve 142 upwardly therealong.

In operation, clamping of the carrier 20 to the track 12 through use of lock 32, forces the ramp 36 tightly upon the upper edge of track 12 against the action of spring 54. Consequently, when trolley 14 is moved along the track 12 toward the lowering mechanism of the instant invention, trolley wheel 18 will be diverted from the track 12 and ride along the upper edge of the rail 34 until the wheel 18 moves into engagement with the standing end 60 of chain 62.

Releasing of the brake 84—126 permits rotation of the wheels 80 and 86 with a consequent downward movement of the trolley 14 between the plate 58 and the member 68, carried by the chain 62. Manifestly, as the operator manipulates the pull cable 136, the running end 64 of chain 62 may be payed out gradually from the wheel 80 to lower the carcass 10 at any desired speed.

At the same time, the wheel 86 takes up the chain 90 and, therefore, when the lowermost end of the carcass 10 is connected to the running end 92 of chain 90, it will be simultaneously raised toward the bumper 94. This is accomplished through use of any suitable tie means 152 received in hook 148.

Carcass 10 is severed as at 154 in the usual manner to subdivide the carcass 10 into a hind quarter 156 and a front quarter 158. When the sleeve 142 reaches a position adjacent or against the bumper 94, a cart or other receiving means is placed beneath the carcass 10 and the severance 154 completed, whereby the hind quarter 156 may be removed from the hook 16 and deposited in such cart. Thereupon, in order to lower the front quarter 158 into such cart, the operator actuates the pull means 124 to break the toggle linkage 100.

Downward swinging movement imparted to the link 118, swings the lug 122 against the link 104 to break the linkage 100. As pivot pin 106 swings downwardly, the sheave 108 swings upwardly with the rod 110 against the action of spring 114. In such condition, the chain 90 extends substantially horizontally between pulley 98 and wheel 86, thereby increasing the effective length of chain 90 and lowering the front quarter 158 into the underlying cart.

Upon removal of the quarter 158 from the hook 148 and release of the pulling means 124, springs 114 and 116 cooperate in returning the collapsible mechanism 100 to the position illustrated in the drawings. Weight 146 is provided on the chain 90 to always maintain the same in a taut condition and, therefore, assure its proper coiling about the wheel 86. The chain 62 may be rewound upon the wheel 80 by pulling downwardly on the standing end 92 of chain 90 while holding the brake 84—126 released through use of the pull cable 136.

When it is desired to relocate the carrier 20 on track 12, it is but necessary to release lock 32, whereupon spring 54 raises the ramp end 36 of rail 34 off the track 12, the carrier 20 thereupon being supported solely by the rollers 28 and 30.

Having thus described the invention what is claimed as new and desired to be secured by Letters Patent is:

1. In an overhead track unit, a mechanism for lowering and raising an animal carcass or the like comprising a section of rigid track; a section of flexible track attached to and forming a continuation of an end of said rigid track, said flexible track having engagement with a support spaced from said rigid track end; and windlass means connected to an extended portion of said flexible track whereby when a track supported carcass carrying trolley is disposed on the section of said flexible track between the end of said rigid track and said support, the windlass may be operated to pay out and take in said flexible track and thereby raise and lower said trolley.

2. An overhead track unit as set forth in claim 1 wherein said mechanism is adapted to be mounted on an overhead rail of a conveyor assembly rotatably supporting a trolley, said rigid track and the flexible track normally being to one side of and in substantially longitudinal parallelism with said rail and said rigid track including an outer integral curved segment remote from said flexible track and engaging the upper edge of the rail for derailing a trolley rolling along the rail toward the unit and thereby directing the same onto the flexible track between said end of the rigid track and said support.

3. An overhead track unit as set forth in claim 1 wherein is provided means connected with said windlass for rotating the latter in a direction to take up said flexible track after said carcass is removed from said trolley at the lower end of the path of travel.

4. An overhead track unit as set forth in claim 3 wherein is provided a flexible element adapted for attachment to the normally lowermost end of the carcass when the same is suspended from a trolley supported by the flexible track between said support and said rigid end of the track, said flexible element being trained about said windlass means in a direction to be taken up thereby at a rate correlated with paying out of said flexible track to cause the carcass to be shifted from the initially vertical disposition to a substantially horizontal position as the trolley is lowered.

5. An overhead track unit as set forth in claim 4 wherein said windlass means includes a pair of coaxial wheels joined to a common shaft, said flexible track and the flexible element being trained about respective wheels in opposite directions.

6. An overhead track unit as set forth in claim 4 wherein is provided means engageable with said windlass means for selectively controlling rotation of the latter and thereby paying out of flexible track and take up of said flexible element whereby movement of the carcass from the vertical to said horizontal position thereof may be controlled.

7. An overhead track unit as set forth in claim 6 wherein is provided collapsible toggle structure in spaced relationship to said windlass means, and said flexible element passing thereover for lowering said end of the carcass a predetermined distance after the same has been moved to said horizontal position and upon collapsing of said structure.

8. An overhead track unit as set forth in claim 7 wherein is provided a pulley on the mechanism, said toggle structure including a pair of pivotally interconnected links, one of the links being pivotally connected to the mechanism and the other link having a sheave on the outer end thereof, said links normally extending toward said windlass mechanism and said flexible element being trained over the pulley, thence under the sheave and extending from the sheave to said windlass means whereby upon movement of the links to a collapsed condition, the effective length of the flexible element extending from said windlass means is increased without rotating the latter.

9. An overhead track unit as set forth in claim 8 wherein said mechanism includes a hook at one end thereof normally overlying the rail when said mechanism is on the rail and a locking member adjustably mounted on the mechanism in a position to engage the rail and releasably clamp the rail between the hook and said member, there being yieldable means between said member and the mechanism for biasing said end of the mechanism out of engagement with the rail upon movement of said member in a direction away from said hook.

References Cited in the file of this patent

UNITED STATES PATENTS

| 418,927 | Richter | Jan. 7, 1890 |
| 975,806 | Terril et al. | Nov. 15, 1910 |
| 1,479,593 | Fantz | Jan. 1, 1924 |
| 2,159,623 | Schmidt | May 23, 1939 |

FOREIGN PATENTS

| 233,785 | Great Britain | May 15, 1925 |